Patented Aug. 5, 1930

1,772,386

UNITED STATES PATENT OFFICE

IRA H. DERBY, OF INDIANAPOLIS, INDIANA, AND ORIN D. CUNNINGHAM, OF PROVO, UTAH, ASSIGNORS TO PETER C. REILLY, OF INDIANAPOLIS, INDIANA

FROTH-FLOTATION PROCESS AND PRODUCT FOR EFFECTING SAME

No Drawing.   Application filed June 17, 1927.   Serial No. 199,625.

The present invention relates to certain improvements in the froth flotation process of minerals by the use of certain "nuclear phosphorus," sulfur-containing organic compounds which contain naphthalene, or analogous substances, as part of the molecular structure, as herein set forth. The invention embraces both the product and the method of making the same, as well as the use of the product in the froth flotation of minerals.

Our present invention is based upon our discovery that materials having a high flotation value can be prepared by a two step reaction, in which a substance such as naphthalene (or others as mentioned below) will react with phosphorus pentasulfide (or with phosphorus and sulfur) to form an intermediate product which in turn is caused to react with phenol (or certain other substances mentioned below), to produce the flotation material of our present invention. The phosphorus sulfur derivatives of naphthalene and analogous substances, may be looked upon as phosphorizing and sulfidizing agents for the production of "nuclear phosphorus" sulfur organic compounds of flotation value, having within their molecular structure the hydrocarbonaceous substances originally present in the phosphorizing sulfidizing agent used.

We have found that sulfides of phosphorus, such as phosphorus pentasulfide ($P_2S_5$), chemically combine with naphthalene (and analogous substances) at or near the boiling point of naphthalene, with the elimination of hydrogen sulfide, to form a phosphorus sulfur derivative, containing one or two molecules of naphthalene within its molecular structure, depending on the extent of the reactions; the resulting intermediate product being either crystalline or resinous in nature depending on its method of preparation. Our observations have definitely established that the elimination of one molecule of hydrogen sulfide ($H_2S$) per molecule of phosphorus pentasulfide ($P_2S_5$) is associated with the reaction of one molecule of naphthalene, this reaction taking place easily at 205° C. or thereabout, while a further substitution of naphthalene goes on slowly at this temperature, and more rapidly at a more elevated temperature, such as for example 250° C. or thereabout.

These intermediate products produced by the reaction of naphthalene (and analogous substances especially polynuclear aromatic hydrocarbon compounds) and sulfides or phosphorus, while themselves being of little or no flotation value in the froth flotation of minerals, possess the property of readily combining chemically with quite a large variety of organic (or in some cases, inorganic) substances to form compounds of very efficient flotation value and we give the following classification of compounds which thus react with said intermediate products:—

(a) Phenols, such as carbolic acid, or its homologues, or the alkali metal salts of phenols such as potassium phenolate or sodium cresylate or the like, (b) The alcohols such as ethyl alcohol or the alkali metal salts of alcohols such as sodium ethylate, (c) The mercaptols, for example ethyl mercaptol and the alkali metal salts of mercaptol, such as the sodium or potassium salts of ethyl mercaptol, (d) The aromatic mercaptols and their alkali metal salts for example phenyl mercaptol, sodium phenyl mercaptol, etc., (e) The aliphatic and aromatic bases, including such substances as ethylamine, aniline or its homologues or other aromatic bases, such as pyridine, quinolin, etc., and (f) The nitriles, for example benzonitrile, tolylnitrile.

Where alkali metal salts or compounds are above mentioned, alkaline earth metal compounds and earth metal compounds can also be used.

The reaction of phosphorus pentasulfide with, for example, naphthalene yields a compound (intermediate product) which may be regarded as a naphthalene thio-phosphoric acid anhydride, which may react with a variety of compounds, as already indicated, to form an organic thio-phosphoric acid, acid salt or acid ester, or normal salt (or ester) compounds, (or stated generically, an "organic-thio-phosphoric acid compound", which term is hereinafter so used) containing within its molecular structure naphthalene (or analogous substances), such materials having excellent flotation value in froth flotation of minerals.

We are aware that phosphorus pentasulfide ($P_2S_5$) reacts directly with substances of the above classification to form flotation reagents, but we maintain that the use of naphthalene (and analogous substances) in the complete preparation comprising our invention, not only produces a class of flotation compounds differing distinctly in composition, but also constitutes an improvement over the direct use of phosphorus pentasulfide ($P_2S_5$) on the above classified substances (a to f); (1) by requiring less of these substances to produce the corresponding thiophosphoric acid or ester, acid salt or ester, or normal salt or ester organic derivative (due to the preliminary incorporation of naphthalene into the molecular structure of $P_2S_5$ by our method, thereby resulting in a partial saturation of this compound with respect to its power to unite with certain organic substances) and (2) by the naphthalene providing a very convenient means of carrying out the reaction where phosphorus and sulfur are used as the starting material instead of phosphorus sulfides, the naphthalene serving as a very excellent diluent for these two substances to retard the violence of their reaction; the whole resulting in a greater economy of production and greater ease of preparation of materials.

Our invention may be regarded essentially as the discovery of new and improved groups of phosphorizing and sulfidizing agents, namely the phosphorus sulfur derivatives of certain hydro-carbonaceous substances, such as naphthalene and its use for the production of "nuclear phosphorus" sulfur organic material as a new class of flotation compounds, having within its molecular structure the hydrocarbonaceous substance originally present in the phosphorizing sulfidizing agent used.

These final materials have a very high selective action or collecting power for metalliferous materials, such as sulfide minerals in mineral froth flotation operations, but (in the absence of oil materials) are lacking in frothing properties, so that an appropriate frothing agent such as pine oil or tar acids should preferably be employed in conjunction therewith in carrying out the flotation operation.

It is not necessary that chemically pure substances be used since the unrefined products can be employed with metallurgical results practically as good as those obtained with pure substances. The phosphosulfo compounds of our invention may be used either alone or with suitable solvent agents such as cresylic acid.

Although we have mentioned naphthalene as the preferred hydrocarbonaceous substance to be used in our process we do not limit ourselves to this particular material, but may use analogous coal tar crystalline substances such as carbazol, acenaphthene, phenanthrene, anthracene, or mixtures of the same, which substances are hereinafter embraced within the term, "an aromatic polynuclear hydrocarbonacenous organic substance capable of forming a thio-phosphoric acid anhydride derivative."

Further, in the use of naphthalene and other of the crystalline substances from coal tar or any other hydrocarbonaceous substances of the types herein mentioned we do not limit ourselves to the use of pure materials but can use partially refined materials with equally good results as for example, a naphthalene crude which has been whizzed and washed preparatory to its final purification by sublimation.

We give the following examples, but we do not restrict the invention thereto:—

In the preparation of the "nuclear phosphorus" sulfur organic compounds of our invention, the first step in the process consists in the preparation of our improved phosphorizing and sulfidizing reagent as follows:

Fifty (50) parts of pure or partially refined naphthalene and 37.9 parts of sulfur are melted together and heated to 200° C, or thereabout with stirring. At this temperature the sulfur and naphthalene will form a homogeneous solution. To this solution, preferably in an inert atmosphere, is then slowly added 12.1 parts of melted yellow phosphorous with stirring. The rate of addition of the phosphorus may be conveniently governed by the temperature of the reaction mixture, regulating the flow of phosphorus so that said temperature does not rise above a certain temperature limit, such as 210° C. When the addition of the phosphorus is complete the reaction of the phosphorus and sulfur to form phosphorus sulfide may be said to be complete. The process then consists in bringing about the reaction of the phosphorus sulfide thus formed with the naphthalene by maintaining the temperature of the reaction mixture at 210° C., or thereabout, until there is a loss of 6.5 parts, or thereabout, of sulfur as hydrogen sulfide, which may require from one to two hours time. The product obtained is an amber colored resinous material, liquid at 100° C. or thereabout or it may separate as a crystalline product. The resin is most likely to be formed by allowing the reaction mixture to cool without stirring (a super-cooled liquid) which on standing may change to a crystalline condition.

Instead of starting with phosphorus and sulphur, 43.5 parts of phosphorus pentasulfide ($P_2S_5$) and 6.5 parts of sulfur may be combined with 50 parts of naphthalene with equally good results.

Although an excess of sulfur over phosphorus pentasulfide is not essential we prefer to use a small excess, not limiting ourselves however to the amount employed above, nor do we limit ourselves to the above specified temperature and time.

We have found it convenient to use an excess of naphthalene over that required for the reaction with phosphorus pentasulfide, the excess of naphthalene serving as a convenient solvent medium for the naphthalene thio-phosphoric acid anhydride formed, (by using about twice the amount of naphthalene employed in the above preparation, the naphthalene-phosphosulfo compound will separate out of the naphthalene as a crystalline material and may be separated in a very pure condition by a solvent extraction of the excess naphthalene. Benzol is a suitable solvent for this purpose.)

Working under substantially the same conditions, the naphthalene of the above preparation may be replaced with an equal weight (50 pts.) or thereabout, of pure or partially refined ace-naphthene, carbazol, anthracene, phenanthrene or mixtures of the same (as they ordinarily are obtained in the refining of tar), the organic thio-phosphoric acid anhydride compounds thus obtained being equally good as the corresponding naphthalene compound in the preparation of the flotation reagent of our disclosure.

The next step in our process consists in combining the organic thio-phosphoric acid anhydride compounds, as prepared above, as for example the naphthalene derivative, with various substances to form the corresponding organic thio-phosphoric acid derivatives as illustrated by the following examples.

(1) 42 parts of the naphthalene-phosphosulfo reagent as prepared above are slowly mixed with 58 parts of anhydrous tar acid, the temperature during the mixing, not being allowed to rise above 70° C. or thereabout. The reaction takes place readily and may be considered to be complete when the mixture has become homogeneous. The product is a syrupy liquid. The amount of tar acid used may be varied arbitrarily so long as there is sufficient present for the reaction, it being preferable to use enough in excess to leave the reaction product in a liquid condition, any excess tar acid also serving as a very good frothing reagent.

In the above preparation we do not limit ourselves to a reaction temperature, but may use a little higher temperature such as 125° C. to bring about a complete combination of these substances.

(2) As another example we may carry out the above combination with one half the amount of tar acid specified, namely 29 parts, and then add 29 parts of an anhydrous tar acid solution of sodium cresylate (43% by weight). This results in the formation of the sodium salt.

(3) Or 42 parts of the naphthalene phospho-sulfo reagent may be combined directly with 58 parts of a tar acid solution of sodium cresylate (18 to 34% by weight).

(4) 42 parts of naphthalene phospho-sulfo reagent are slowly added to 29 parts of anhydrous ethyl alcohol with stirring, and at such a rate that the reaction mixture is kept at or near the boiling point of the alcohol. The reaction may be said to be complete when the reaction mixture has become homogeneous. The sodium salt of the acid ethyl ester thus obtained may be got by the addition of 29 parts of a sodium cresylate tar acid solution as in Example 2. In case the sodium salt is not formed the amount of alcohol used may be increased.

Sodium alcoholate in alcohol may be used in place of sodium cresylate in tar acid, but the latter is preferred because of its greater ease of preparation in an anhydrous condition.

(5) Or, as in Example 4, ethyl mercaptol may be used, the reaction taking place readily at the boiling point of ethyl mercaptol.

Or, in a similar manner the phenyl mercaptol derivative may be obtained.

The general procedure outlined in the above examples may be applied in chemically combining the naphthalene thio-phosphoric acid anhydride product with any of the compounds included in the classification $a$ to $f$, outlined in the early part of this specification, these reactions taking place readily at slightly elevated temperatures in the presence, preferably, of an excess of the reacting organic liquid substance (or some other inert organic liquid substance) to serve as a solvent.

It is usually not necessary to effect a separation of the reaction products in the above examples from the solvents, but the product can be used for flotation in its unrefined condition.

The products obtained, as illustrated in the above examples, were employed in the flotation of a copper sulfide ore of the Utah Copper Co., containing some copper oxides and analyzing about 0.9% copper, in the ratio of about one-tenth pound of product per ton of dry ore, and tar acids as a frothing agent, and a lime circuit being employed in conjunction therewith. The ore was subjected to the ordinary flotation operation in a mechanical agitation type of flotation machine and a tailing analyzing 0.10% copper was obtained, together with a high grade concentrate, corresponding to a recovery of about 90% of the copper value in the ore under treatment.

In other tests we have used both smaller and larger amounts of the phospho-sulfo compounds, of our invention, in the flotation of ores, with satisfactory results, and we have also used phospho-sulfo compounds both alone and with other flotation agents, with very satisfactory result. Furthermore, we do not limit our conditions for carrying out a flotation operation to those included in the above example, but may use any type of flotation machine, as for example, the Callow cell, or, instead of an alkaline circuit, we may use a normal or acid circuit.

In the above specification we have referred to the use of alcohol, such as ethyl alcohol. It is to be understood that other alcohols or mixtures thereof, such as denatured alcohol, methyl, propyl alcohol and higher alcohols can be likewise employed. We prefer to employ alcohols containing not over five carbon atoms, since those containing more than five carbon atoms are not as suitable.

In several of the above examples we have referred to alkali metal salts, as constituting the flotation agent or substances used in the preparation thereof. We desire it understood that while we have secured satisfactory results with the alkali metal salts, other salts such as the alkaline earth metal salts, (especially the salts of sodium, potassium and calcium) can also be employed so far as these are soluble in oil or water or emulsions thereof. The procedure for making the alkaline earth metal salts, etc. will be obvious from the above disclosure.

In the appended claims, the terms phenolic body, organic compound containing an OH group, etc. are intended to cover the phenols and other OH compounds as above stated, either in their free state or in the form of their metal salts or derivatives, as above described.

The reactions are somewhat involved and without limiting ourselves to any exact theory, we believe that when using naphthalene as the starting material, as in the specific example, we believe the intermediate to be

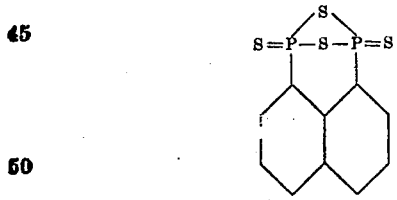

When reacting on this with phenol, we believe the resulting product to be

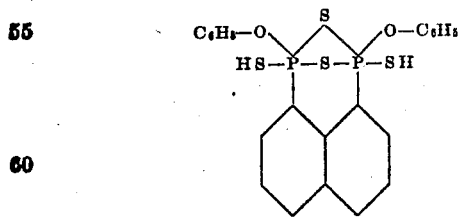

The present case is a continuation in part of our co-pending application Serial No. 96,061, filed March 19, 1926.

In the present case we have described the use of phenol, alcohol, mercaptol, and the alkali metal salts thereof, as well as nitriles, and aromatic bases, as substances to react with hydrocarbonaceous thio-phosphoric acid anhydrides to form flotation reagents. We have given several examples of such phenols, etc., which are operative for the purpose, and we believe that certain closely related phenols, etc., can be used, though there are others that will not serve. The expressions "phenols", etc., as used in this case are accordingly to be construed as covering the examples given herein and products so related thereto as to function in a like manner.

We claim:—

1. Flotation of ores while in the presence of a polynuclear aromatic hydrocarbon compound of an organic-thio-phosphoric acid.

2. A flotation reagent comprising the reaction product of a phosphorus sulfide with naphthalene combined with a phenolic body.

3. A process which comprises reacting with a phosphorus sulfide on naphthalene, reacting upon the product with an organic compound containing an OH group.

4. A process which comprises reacting with a phosphorus sulfide on naphthalene, reacting upon the product with a phenolic body.

5. A process which comprises reacting with a phosphorus sulfide on naphthalene, reacting upon the product with an organic compound containing an OH group in the presence of an excess of the latter.

6. Flotation of ores while in the presence of an organic thio-phosphoric acid compound of an aromatic polynuclear hydrocarbon combined with an organic compound containing an OH group.

7. A process which comprises reacting with phosphorus and sulfur on a polynuclear aromatic hydrocarbon compound, and reacting on the product with an OH compound of a hydrocarbon.

8. A process which comprises reacting with phosphorus and sulphur, on an aromatic polynuclear hydrocarbonaceous organic substance capable of forming a thiophosphoric acid anhydride derivative, and reacting on the product with a compound containing an OH group, as specified herein, to form a flotation agent.

9. A process which comprises floating ore material in the presence of an organic-thio-phosphoric acid compound united with an aromatic polynuclear hydrocarbonaceous organic radical as an essential part of its composition.

10. A new flotation reagent comprising an organic-thio-phosphoric acid compound united with an aromatic polynuclear hydrocarbonaceous organic radical as an essential part of its composition.

11. A process which comprises reacting with phosphorus and sulphur, on an aromatic polynuclear hydrocarbonaceous organic substance capable of forming a thiophosphoric acid anhydride derivative, and reacting on such derivative with a substance selected from the herein described group consisting of phenols, alcohols, mercaptols, and salts thereof, and organic bases.

12. Flotation of ores while in the presence of an organic-thio-phosphoric acid compound of naphthalene combined with a tar acid.

13. Flotation of ores while in the presence of an organic-thio-phosphoric compound of naphthalene combined with alkali metal salts of tar acids.

In testimony whereof we have signed our names to this specification.

IRA H. DERBY.
ORIN D. CUNNINGHAM.